United States Patent
Berggren et al.

(10) Patent No.: US 9,042,071 B2
(45) Date of Patent: May 26, 2015

(54) BREAKER FAILURE PROTECTION OF HVDC CIRCUIT BREAKERS

(75) Inventors: Bertil Berggren, Västerås (SE); Jianping Wang, Västerås (SE); Juiping Pan, Raleigh, NC (US); Kerstin Linden, Ludvika (SE); Reynaldo Nuqui, Raleigh, NC (US)

(73) Assignee: ABB RESEARCH LTD, Zurich (CH)

( * ) Notice: Subject to any disclaimer, the term of this patent is extended or adjusted under 35 U.S.C. 154(b) by 0 days.

(21) Appl. No.: 13/702,333

(22) PCT Filed: Sep. 13, 2010

(86) PCT No.: PCT/EP2010/063377
§ 371 (c)(1),
(2), (4) Date: Dec. 6, 2012

(87) PCT Pub. No.: WO2011/157306
PCT Pub. Date: Dec. 22, 2011

(65) Prior Publication Data
US 2013/0077204 A1    Mar. 28, 2013

Related U.S. Application Data

(60) Provisional application No. 61/354,535, filed on Jun. 14, 2010.

(51) Int. Cl.
*H02H 3/44* (2006.01)
*H02H 7/26* (2006.01)
*H02H 7/22* (2006.01)
*H02H 7/30* (2006.01)

(52) U.S. Cl.
CPC ............ *H02H 7/268* (2013.01); *H02H 3/445* (2013.01); *H02H 7/30* (2013.01); *H02H 7/222* (2013.01)

(58) Field of Classification Search
CPC .................................. H02H 3/05; H02H 3/445
USPC .......................................... 361/93.1, 96, 102
See application file for complete search history.

(56) References Cited

U.S. PATENT DOCUMENTS 3,660,723 A * 5/1972 Lutz et al. .................. 361/9
3,777,215 A   12/1973 D'Esopo
(Continued)

FOREIGN PATENT DOCUMENTS

JP    61-164423 A    7/1986

*Primary Examiner* — Thienvu Tran
*Assistant Examiner* — Ann Hoang
(74) *Attorney, Agent, or Firm* — Birch, Stewart, Kolasch & Birch, LLP

(57) ABSTRACT

A breaker failure protection system for a high voltage direct current, HVDC, circuit breaker is provided. The circuit breaker is arranged for interrupting a DC circuit upon reception of a trip signal. The protection system includes a current sensor, at least one inductor, and a breaker failure detection unit. The current sensor is arranged for measuring a current I(t) through the DC circuit. The at least one inductor is connected in series with the DC circuit. The breaker failure detection unit is arranged for assessing, whether the circuit breaker has failed, and sending, if the circuit breaker has failed, a trip signal to an adjacent circuit breaker. The assessment is based on the measured current. The stability of HVDC grids may be improved by sending, in case of a breaker failure, a trip signal to adjacent circuit breakers. Further, a method of breaker failure protection for an HVDC circuit breaker is provided.

4 Claims, 3 Drawing Sheets

(56) References Cited

U.S. PATENT DOCUMENTS

| | | |
|---|---|---|
| 3,786,310 A | 1/1974 | Long |
| 5,157,575 A | 10/1992 | Feltis et al. |
| 5,828,540 A | 10/1998 | Marmonier et al. |
| 6,058,353 A | 5/2000 | Goodpaster |
| 2006/0227469 A1* | 10/2006 | Parker et al. ............ 361/5 |
| 2009/0005915 A1 | 1/2009 | Wimmer |

* cited by examiner

BREAKER FAILURE PROTECTION OF HVDC CIRCUIT BREAKERS

CROSS REFERENCE TO RELATED APPLICATIONS

This application is the National Phase of PCT/EP2010/063377 filed on Sep. 13, 2010, which claims priority under 35 U.S.C. 119(e) to U.S. Provisional Application No. 61/354,535 filed on Jun. 14, 2010, all of which are hereby expressly incorporated by reference into the present application.

FIELD OF THE INVENTION

The invention relates in general to high voltage direct current (HVDC) power transmission, and more specifically to breaker failure protection of HVDC circuit breakers.

BACKGROUND OF THE INVENTION

HVDC power transmission is becoming increasingly important due to the steadily rising need for bulk power delivery and power grid interconnections. In particular, using HVDC transmission based on voltage source converters (VSC), power can be transmitted with underground cables and overhead lines which are embedded or overlapped with high voltage alternating current (AC) transmission networks. An attractive feature of HVDC transmission is that the direction of power transmission can be changed by changing the direction of current.

An HVDC grid comprises multiple VSCs, also referred to as terminals, which convert an AC power source for transmission over an HVDC transmission line, i.e., cables or overhead lines. Different configurations of HVDC transmission lines are known, such as monopole, symmetric monopole, and bipolar. For instance, a bipolar HVDC transmission line comprises a positive pole line, a negative pole line, and a metallic return line connected to ground. Within the grid, each terminal may be connected to multiple terminals by HVDC transmission lines resulting in different types of topologies. Such a multiple terminal grid enables efficient congestion management and has an improved stability against disturbances.

Direct current (DC) circuit breakers are commonly used for isolating faulty components, such as transmission lines, in HVDC grids. Due to the low inductance of DC transmission lines, as compared to AC systems, HVDC systems suffer from a high rate of rise of fault induced currents. Thus, the tripping of DC breakers has to be effected before the rising current exceeds the interrupting capacity of the breakers. In order to provide an improved stability of such grids, a breaker failure protection of DC circuit breakers is desirable.

SUMMARY OF THE INVENTION

It is an object of the present invention to provide a more efficient alternative to the above techniques and prior art.

More specifically, it is an object of the present invention to provide an improved breaker failure protection of high voltage direct current (HVDC) circuit breakers.

These and other objects of the present invention are achieved by means of a breaker failure protection system having the features defined in independent claim 1, and by means of a method of breaker failure protection defined in independent claim 4. Embodiments of the invention are characterized by the dependent claims.

According to a first aspect of the invention, a breaker failure protection system for an HVDC circuit breaker is provided. The circuit breaker is arranged for interrupting a DC circuit upon reception of a trip signal. The system comprises a current sensor, at least one inductor, and a breaker failure detection unit. The current sensor is arranged for measuring a current I(t) through the DC circuit. The at least one inductor is connected in series with the DC circuit. The breaker failure detection unit is arranged for assessing whether the circuit breaker has failed and sending, if the circuit breaker has failed, a trip signal to an adjacent circuit breaker. The assessment, whether the circuit breaker has failed, is based on the measured current.

According to a second aspect of the invention, a method of breaker failure protection for an HVDC circuit breaker is provided. The circuit breaker is arranged for interrupting a DC circuit upon reception of a trip signal. The method comprises the steps of measuring a current I(t) through the DC circuit, assessing whether the circuit breaker has failed, and sending, if the circuit breaker has failed, a trip signal to an adjacent circuit breaker. The assessment, whether the circuit breaker has failed, is based on the measured current.

For the purpose of describing the present invention, a DC circuit is a connection for carrying a direct current between two connection points at which the circuit breaker is electrically connected to an external circuit.

The present invention makes use of an understanding that the breaker failure protection of DC circuit breakers may be improved by connecting at least one inductor, also referred to as station reactor, in series with the DC circuit breaker. Preferably, two inductors are used, one on either side of the circuit breaker. Since, in a DC system, the rate of rise of current is proportional to the inductance of the system, the effect of the inductors is to impede the flow of current when it commutates from the faulty circuit breaker during a failure. The presence of one or more inductors according to embodiments of the invention is advantageous since it reduces the risk of the current exceeding the interrupting capacity of the adjacent circuit breaker. In addition, the fault current duty of the adjacent circuit breaker is reduced. A further advantage is that the stability of HVDC grids may be improved by sending, in case of a breaker failure, a trip signal to adjacent circuit breakers.

According to an embodiment of the invention, the breaker failure detection unit is further arranged for assessing whether the circuit breaker has failed by deciding that the circuit breaker has failed if $|I(t)|>0$ after a predetermined time interval $\Delta t_1$ has lapsed. $\Delta t_1$ starts from the reception of the trip signal by the circuit breaker. The time delay is used to let the circuit breaker complete its tripping action. Utilizing the current in the assessment whether the circuit breaker has successfully tripped is advantageous since it provides a simple and effective way of detecting a breaker failure. A non-zero current, which is detected after a certain time period has lapsed since the circuit breaker received a trip signal, is interpreted as an indication of a breaker failure.

According to another embodiment of the invention, the breaker failure detection unit is further arranged for assessing whether the circuit breaker has failed by evaluating a derivative $$\frac{d|I(t)|}{dt}$$

of the absolute value of the measured current, and deciding that the circuit breaker has failed if $$\frac{d|I(t)|}{dt} > -I'_0$$

during a predetermined time interval $\Delta t_2$. $I'_0$ is a predetermined positive value. Utilizing the DC current derivative as a measure in evaluating the successful tripping of DC circuit breakers is advantageous since it provides an improved breaker failure protection. More specifically, it renders the assessment of a breaker failure more reliable. Solely relying on the absolute value of the current in the assessment of a breaker failure poses a problem in DC systems since, if the current sensors are external to the DC circuit breaker, the transient response of the breaker current is oscillatory in nature rather than a sudden drop to zero after current breaking. By taking into account the current derivative as well, the risk of misclassifying the current transient in a healthy breaker as an indication of breaker failure is reduced.

Even though embodiments of the present invention, and advantages thereof, have in some cases been described with reference to the breaker failure protection system for an HVDC circuit breaker according to the first aspect of the invention, corresponding reasoning applies to embodiments of the method according to the second aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
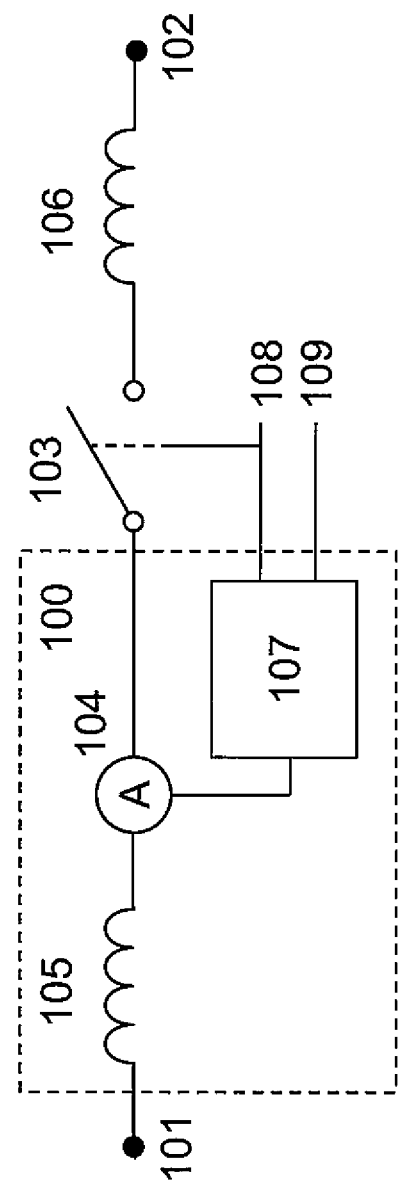
FIG. 1 shows a breaker failure protection system for an HVDC circuit breaker, in accordance with an embodiment of the invention.

In FIG. 1, a breaker failure protection system 100 for an HVDC circuit breaker 103 according to an embodiment of the invention is shown.

Circuit breaker 103 is arranged for interrupting a DC circuit, i.e., a connection for carrying a direct current between connection points 101 and 102, upon reception of a trip signal 108. The breaker failure protection system 100 comprises a current sensor 104, arranged for measuring the current through the DC circuit between 101 and 102, an inductor 105 connected in series with the DC circuit, and a breaker failure detection unit 107. Preferably, two inductors 105 and 106 are used, one on either side of the circuit breaker 103.

Breaker failure detection unit 107 receives current measurements from sensor 104. Further, it retrieves the trip signal 108 which is used to trigger the action of circuit breaker 103. Breaker failure detection unit 107 is arranged for assessing whether the circuit breaker 103 has succeeded in breaking the current by evaluating the measured current in a way elucidated below. If circuit breaker 103 fails to interrupt the current, breaker failure detection unit 107 sends a trip signal 109 to at least one adjacent circuit breaker, either directly or through an external breaker failure protection system.

Figure 2:
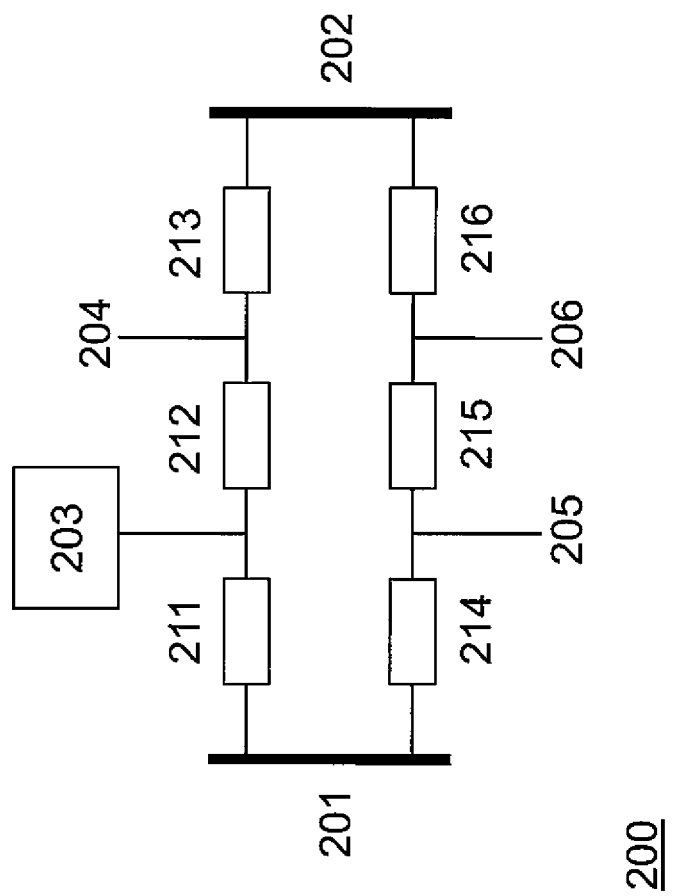
FIG. 2 shows an HVDC switchyard, in accordance with an embodiment of the invention.

The purpose of inductors 105 and 106 connected in series with the DC circuit, one on either side of the circuit breaker, is to impede the flow of current when it commutates from the faulty current breaker to a backup breaker. This is explained with reference to FIG. 2, which shows an example of an HVDC switchyard.

Switchyard 200 is designed to interconnect a power source 203, such as a voltage source converter, and HVDC transmission lines 204-206, via DC buses 201 and 202. For the purpose of routing the power, switchyard 200 comprises HVDC circuit breakers 211-216. Circuit breakers 211-216 may, e.g., be of the same type as circuit breaker 100 described with reference to FIG. 1, or any other HVDC circuit breaker for which breaker failure protection is provided in accordance with the invention.

Assuming that a fault occurs on transmission line 206, a trip signal is sent, by an external breaker failure protection unit, to circuit breaker 215 and 216 in order to interrupt the current. In case circuit breaker 215 fails, a trip signal is sent to backup breaker 214. If circuit breaker 216 trips successfully, its current will commutate to circuit breaker 214 via circuit breakers 213, 212, and 211. It is this commutation of current which is impeded by the inductors 105 and 106, thereby avoiding a sudden change in current through the failed circuit breaker and the backup breakers.

Figure 3:
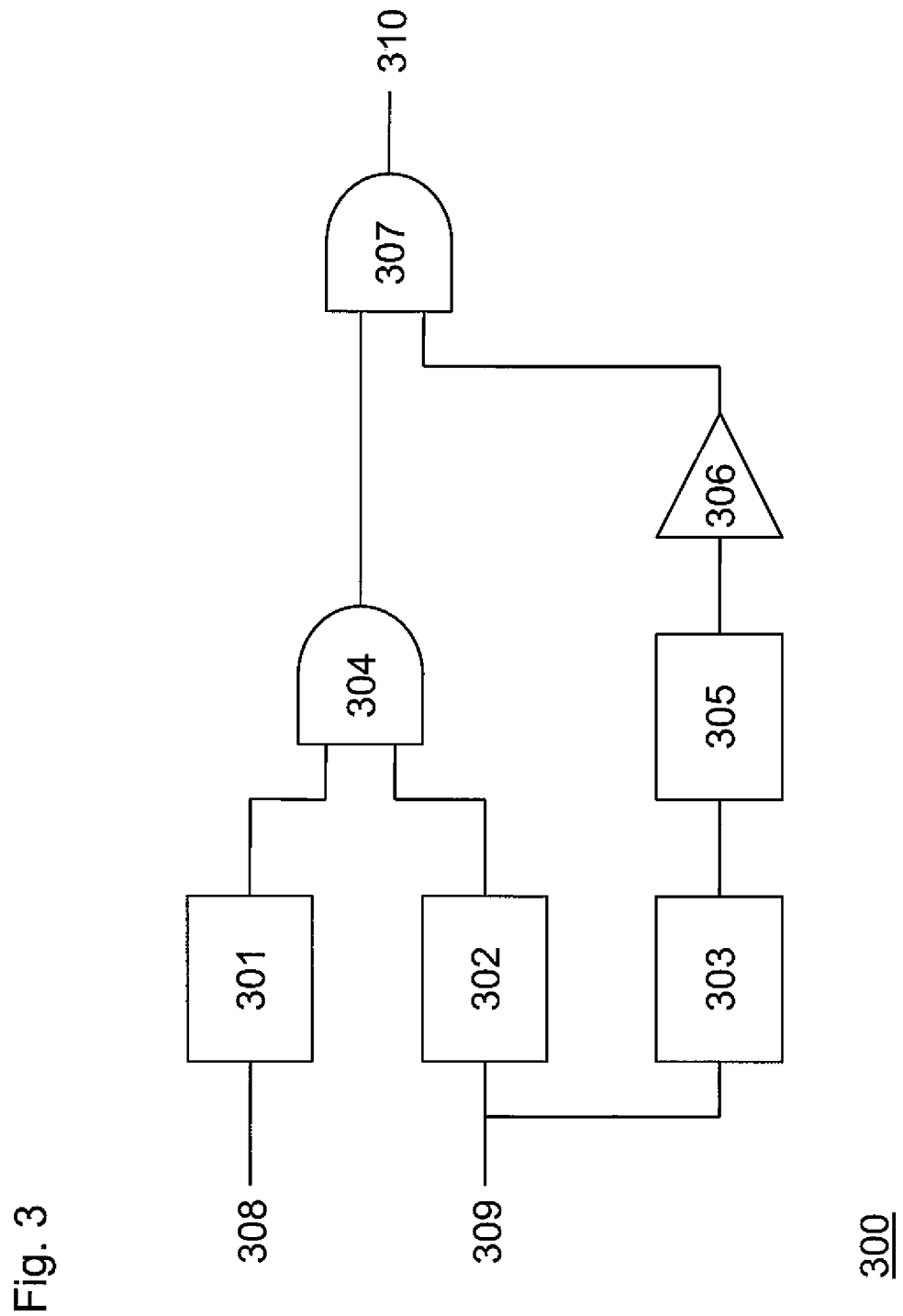
FIG. 3 shows a breaker failure detection unit, in accordance with an embodiment of the invention.

With reference to FIG. 3, an embodiment of the breaker failure detection unit comprised in a breaker failure protection system, such as breaker failure detection unit 107 described with reference to FIG. 1, is illustrated.

Breaker failure detection unit 300 comprises a timer 301, a current element 302, a current derivative element 303, logical-and gates 304 and 307, a persistency element 305, and a logical inverter 306. The units 301-307 are arranged for implementing two tests which are used in the assessment of a breaker failure.

First, it is checked whether the absolute value of the measured current 309, retrieved from, e.g., current sensor 104 shown in FIG. 1, is larger than zero after the time interval $\Delta t_1$, which starts with the reception of an external trip signal 308, has lapsed. This is accomplished by timer 301 and current element 302, and by combining their outputs using a logical-and gate 304. A non-zero current, which is persisting after a certain time interval has lapsed, is indicative of a breaker failure. $\Delta t_1$ is chosen such that a healthy breaker has concluded its breaking action before $\Delta t_1$ has lapsed.

Next, it is checked whether the derivative of the absolute value of the current is smaller than a predetermined negative threshold value during a time interval $\Delta t_2$. This second test is accomplished by current derivative unit 303 and persistence element 305. The result of this test is negated and combined, using a logical-and gate 307, with the result of the first test, i.e., the output of logical-and gate 304. The purpose of the second test is to check whether the decrease of current is sufficiently fast. If the drop of current is too small during a predetermined time interval $\Delta t_2$, the output of logical inverter 306 is high, indicating a breaker failure. If the current drops consistently during the time interval $\Delta t_2$, the output of logical inverter 306 is low, indicating a healthy breaker.

The combined result of both tests, i.e., the output of unit 307, is indicative of the occurrence of a breaker failure. In other words, if the output of unit 307 is a logical high, a trip signal is sent to an adjacent backup circuit breaker.

Embodiments of the breaker failure protection system according to the first aspect of the invention, in particular the breaker failure detection unit, may be implemented by circuitry comprising electronic components, integrated circuits (IC), application specific integrated circuits (ASIC), field programmable gate arrays (FPGA), complex programmable logic devices (CPLD), or any combination thereof. Any circuitry may, at least in part, be replaced by processing means, e.g., a processor executing an appropriate software. It will also be appreciated that an embodiment of the method according to the second aspect of the invention may be implemented on a computing device capable of retrieving current measurements from sensors arranged for measuring the current through the DC circuit.

The person skilled in the art realizes that the present invention by no means is limited to the embodiments described above. On the contrary, many modifications and variations are possible within the scope of the appended claims. For example, an embodiment of the HVDC circuit breakers which are protected and tripped, respectively, according to the first aspect of the invention may be based on any DC circuit breaker design, e.g., mechanical breakers, semiconductor based circuit breakers, or combinations thereof. Further, embodiments of the invention are not limited to the configuration illustrated in FIG. 2 but may be arranged in any other configuration, e.g., in a double bus or in a ring bus configuration. It will also be appreciated that embodiments of the invention may be envisaged which solely rely on either one of the tests described above. Finally, it will be appreciated that parts of the breaker failure protection system may be arranged separately from the circuit breaker. For instance, the breaker failure detection unit may be arranged at a separate breaker failure protection system.

In conclusion, a breaker failure protection system for a high voltage direct current, HVDC, circuit breaker is provided. The circuit breaker is arranged for interrupting a DC circuit upon reception of a trip signal. The protection system comprises a current sensor, at least one inductor, and a breaker failure detection unit. The current sensor is arranged for measuring a current I(t) through the DC circuit. The at least one inductor is connected in series with the DC circuit. The breaker failure detection unit is arranged for assessing, whether the circuit breaker has failed, and sending, if the circuit breaker has failed, a trip signal to an adjacent circuit breaker. The assessment is based on the measured current. The stability of HVDC grids may be improved by sending, in case of a breaker failure, a trip signal to adjacent circuit breakers. Further, a method of breaker failure protection for an HVDC circuit breaker is provided.

The invention claimed is:

1. A breaker failure protection system for a high voltage direct current, HVDC, circuit breaker arranged for interrupting a DC circuit upon reception of a trip signal, the system comprising:
   a current sensor being arranged for measuring a current I(t) through the DC circuit,
   at least one inductor connected in series with the DC circuit, and
   a breaker failure detection unit connected to the current sensor and arranged for:
      retrieving the trip signal sent to the circuit breaker;
      assessing, on the basis of the measured current, whether the circuit breaker has failed, and
      sending, if the circuit breaker has failed, another trip signal to an adjacent circuit breaker,
   wherein the breaker failure detection unit is further arranged for assessing whether the circuit breaker has failed by:
   evaluating a derivative $$\frac{d|I(t)|}{dt}$$

of the absolute value of the measured current, and
      deciding that the circuit breaker has failed if $$\frac{d|I(t)|}{dt} > -I'_0$$

during a predetermined time interval $\Delta t_2$, where $I'_0$ is a predetermined positive value.

2. The protection system according to claim 1, wherein the breaker failure detection unit is further arranged for assessing whether the circuit breaker has failed by deciding that the circuit breaker has failed if $|I(t)|>0$ after a predetermined time interval $\Delta t_1$, starting from the reception of the trip signal by the circuit breaker, has lapsed.

3. A method of breaker failure protection for a high voltage direct current, HVDC, circuit breaker being arranged for interrupting a DC circuit upon reception of a trip signal, the method comprising:
   measuring a current I(t) through the DC circuit,
   retrieving the trip signal sent to the circuit breaker,
   assessing, on the basis of the measured current, whether the circuit breaker has failed, and
   sending, if the circuit breaker has failed, another trip signal to an adjacent circuit breaker,
   wherein the step of assessing whether the circuit breaker has failed comprises:
   evaluating a derivative $$\frac{d|I(t)|}{dt}$$

of me absolute value or the measured current, and
      deciding that the circuit breaker has failed if $$\frac{d|I(t)|}{dt} > -I'_0$$

during a predetermined time interval $\Delta t_2$, where $I'_0$ is a predetermined positive value.

4. The method according to claim 3, wherein the step of assessing whether the circuit breaker has failed comprises deciding that the circuit breaker has failed if $|I(t)|>0$ after a predetermined time interval $\Delta t_1$, starting from the reception of the trip signal by the circuit breaker, has lapsed.

* * * * *